(12) United States Patent
Zannoli et al.

(10) Patent No.: US 12,136,147 B2
(45) Date of Patent: Nov. 5, 2024

(54) METHOD FOR THE IMPROVEMENT OF RADIOLOGICAL IMAGES IN THE COURSE OF AN ANGIOGRAPHY

(71) Applicant: ANGIODROID S.R.L., San Lazzaro di Savena (IT)

(72) Inventors: Sebastiano Zannoli, Bologna (IT); Enrico Altini, San Lazzaro di Savena (IT)

(73) Assignee: ANGIODROID S.R.L., San Lazzaro di Savena (IT)

( * ) Notice: Subject to any disclaimer, the term of this patent is extended or adjusted under 35 U.S.C. 154(b) by 403 days.

(21) Appl. No.: 17/609,482

(22) PCT Filed: May 7, 2020

(86) PCT No.: PCT/IB2020/054329
§ 371 (c)(1),
(2) Date: Nov. 8, 2021

(87) PCT Pub. No.: WO2020/225764
PCT Pub. Date: Nov. 12, 2020

(65) Prior Publication Data
US 2022/0230368 A1    Jul. 21, 2022

(30) Foreign Application Priority Data

May 7, 2019    (IT) .......................... 102019000006616

(51) Int. Cl.
*G06T 11/00*     (2006.01)
*G06T 5/50*      (2006.01)
(52) U.S. Cl.
CPC .............. *G06T 11/008* (2013.01); *G06T 5/50* (2013.01); *G06T 2207/10116* (2013.01);
(Continued)

(58) Field of Classification Search
CPC ..................... G06T 11/008; G06T 5/50; G06T 2207/10116; G06T 2207/20224;
(Continued)

(56) References Cited

U.S. PATENT DOCUMENTS 5,315,997 A * 5/1994 Widder .............. A61K 49/1821
424/9.34
10,631,811 B2   4/2020 Volkov et al.
(Continued)

FOREIGN PATENT DOCUMENTS

EP         1 820 450 A1    8/2007

OTHER PUBLICATIONS

International Search Report, International Application No. PCT/IB2020/054329, mailed Sep. 24, 2020, 3 pages.
(Continued)

*Primary Examiner* — Kevin Ky
(74) *Attorney, Agent, or Firm* — Ware, Fressola, Maguire & Barber LLP

(57) ABSTRACT

A method if shown for obtaining improved digital radiological images during a digital subtraction angiography (DSA) intervention, carried out by the introduction of a contrast medium consisting of $CO_2$ or other fluid in an examination zone (Z) of a human or animal body, and the creation of digital radiological images (IMC1, IMC2, IMC3 IMCn) of the examination zone (Z) at the time of contrast medium input. A mask image (IMM1, IMM2, IMM3 IMMn) of the same zone (Z) is subtracted from each image (IMC1, IMC2, IMC3 IMCn) with contrast medium and thus produce a series of "clean" digital radiological images (IMP1, IMP2, IMP3 IMPn) with limited noise. According to the method, each mask image (IMM1, IMM2, IMM3 IMMn) consists of the image with contrast (IMC (2-1), IMC (3-1) IMC (n-1))
(Continued)

immediately preceding the image with contrast currently obtained or by weighted combination thereof.

20 Claims, 3 Drawing Sheets

(52) U.S. Cl.
CPC ............... *G06T 2207/20224* (2013.01); *G06T 2207/30101* (2013.01); *G06T 2210/41* (2013.01); *G06T 2211/404* (2013.01)

(58) Field of Classification Search
CPC ....... G06T 2207/30101; G06T 2210/41; G06T 2211/404
See application file for complete search history.

(56) References Cited

U.S. PATENT DOCUMENTS

| | | | | |
|---|---|---|---|---|
| 10,755,455 | B1* | 8/2020 | Kaethner | G06T 11/008 |
| 2014/0050304 | A1* | 2/2014 | Florent | A61B 6/467 |
| | | | | 378/62 |
| 2014/0270437 | A1* | 9/2014 | Shreiber | G06T 7/30 |
| | | | | 382/130 |
| 2015/0126862 | A1* | 5/2015 | Pfister | A61B 6/4464 |
| | | | | 600/431 |
| 2016/0171716 | A1* | 6/2016 | Schafer | G06T 7/246 |
| | | | | 382/107 |
| 2016/0247325 | A1* | 8/2016 | Yu | H04N 5/32 |
| 2017/0103526 | A1* | 4/2017 | Zaiki | G06T 7/254 |
| 2017/0161897 | A1* | 6/2017 | Hoffmann | A61B 6/5235 |
| 2018/0122088 | A1* | 5/2018 | Ertel | G06T 5/50 |
| 2020/0117957 | A1* | 4/2020 | Birkhold | G06F 18/24 |
| 2020/0312012 | A1* | 10/2020 | Ishii | G06T 7/564 |
| 2020/0330063 | A1* | 10/2020 | Thibault Pelletier | G06T 7/20 |
| 2020/0334815 | A1* | 10/2020 | Oikawa | A61B 6/5252 |
| 2024/0037818 | A1* | 2/2024 | Yamakawa | G06T 11/006 |

OTHER PUBLICATIONS

Written Opinion of the International Searching Authority, International Application No. PCT/IB2020/054329, mailed Sep. 24, 2020, 4 pages.

* cited by examiner

METHOD FOR THE IMPROVEMENT OF RADIOLOGICAL IMAGES IN THE COURSE OF AN ANGIOGRAPHY

TECHNICAL FIELD

The present invention relates to the equipment used for carrying out diagnostic investigations on the human or animal body, in particular through angiography, and refers to a method for improving the effectiveness of the representation, and therefore of the visibility, of the images obtained through the equipment aforementioned.

BACKGROUND ART

As is known, an angiography is a practice of radiological diagnosis which is carried out through the injection of a contrast medium into a blood vessel and the simultaneous acquisition of a series of radiographic images, carried out while the contrast medium flows inside of the vessel, increasing the contrast between it and the surrounding tissues.

The radiographic technique is used to produce an angiogram, i.e. a representative image of the affected area, which allows a detailed analysis of the blood vessels to check for any parietal lesions, stenoses, occlusions, aneurysms, fistulas, etc.

In general, these procedures are carried out in vascular radiology rooms equipped with the necessary equipment for the execution of the radiographic technique, with radiological systems that allow the use of digital technologies for the storage and analysis of the images.

The best feature of digital medical images lies in the possibility of being processed and improved on the computer, even at a later time, through the use of appropriate numerical algorithms, allowing to have more precise and detailed information on the situation of the investigated blood vessel.

The images to be analyzed are obtained through an X-ray beam directed in such a way as to cross the patients body exactly in the area of interest.

For this purpose, X-rays are usually used in combination with fluid contrast media, injected through a catheter in the intervention area, to produce a more detailed picture of organs and blood vessels. Most of the contrast fluids are 'radio-opaque', with an accentuated absorption of X-rays, and cause the blood vessels to present with different blackening with respect to the tissues, in the radiographic images obtained.

In addition to having a high radiological absorption coefficient, in order to clearly describe the structure of the vessel in which it is injected, the contrast medium must have low viscosity, high water solubility and good biological tolerability. Its elimination generally occurs through the kidneys and urinary tract.

Technical Problem

Most commonly used angiographic contrast media are based on iodine, which is highly radiopaque to X-rays, but in some cases it can cause allergies and nonetheless presents a level of nephrotoxicity which is not negligible. Therefore, efforts have been made to use alternative means, such as high purity carbon dioxide which, injected according to controlled volume and pressure conditions, has demonstrated significant advantages compared to traditional and still widely used contrast agents.

This gas is particularly effective in peripheral angiography since, once injected into the vessel, it allows to obtain a good radiographic view of the injection area, without problems of tolerance and disposal, being quickly and totally eliminated via the lung.

$CO_2$, like the iodinated contrast medium, is introduced through the catheter into the vessel, but instead of diluting in the blood it creates a gas bubble that moves through the vessel, dragged by the bloodstream.

The different absorption of the X radiation by the tissues and the gas bubble, which absorbs to a much lesser extent, highlights the vessel in which the bubble is passing, allowing to reconstruct its structure.

During the displacement of the $CO_2$ bubble inside the vessels of progressively smaller caliber, the gas diffuses through the wall, dissolving in the surrounding tissues and the bubble disappears.

For this reason, the mode of introduction of the gaseous contrast medium (pressure and volume) is conditioned by the need to obtain a sufficiently complete vascular filling of the intervention area, and determines the quality and sequence of the radiological images.

Since the discrimination between the vascular structure of interest and the other elements that surround it takes place on the basis of the different absorption of radiation by the contrast medium introduced, which in any case determines differences in light intensity which are not very evident compared to the variations due to the surrounding tissues, with the advent of digital radiology, the technique known as subtraction angiography, or DSA (Digital Subtraction Angiography), has established itself, according to which the images acquired in the presence of contrast medium ($CO_2$) and digitized, are pixel by pixel subtracted with an image obtained before the introduction of the contrast agent (mask).

This procedure allows to effectively remove from the image the contamination of static and repetitive structures, which occur with unchanged intensity before and after the introduction of the contrast medium.

The procedure of image subtraction is used in order to erase the background information from the diagnostic image, considered useless, and is effectively used in the study of blood vessels, which are often hidden, in the images, by the bones and surrounding tissues.

The simplest form of subtraction involves the acquisition of a single image before the introduction of the contrast medium (mask), which will then be subtracted from the subsequent images obtained with a predetermined suitable frequency after a dose of the contrast medium is introduced.

This technique allows to obtain a particularly detailed image of the only blood vessel in which $CO_2$ has been introduced, into which the gas bubble has formed and is moving.

However, between the acquisition of the first image and the moment in which this image is subtracted from the following, dynamic events normally occur: the patient or the organ may have moved slightly, the gas zones present, for example, in the abdomen have moved, the air in the bronchi or lungs has increased/decreased due to the effect of breathing, etc.

These events determine differences between the detected sequential images and the initial "mask" image not due to the injected contrast medium, with an erroneous diagnostic representation provided by the imaging system associated with the radiological equipment.

Considering all the dynamic changes and errors introduced by the movement of the patient in the time interval in which the DSA procedure associated with the use of CO2 as contrast medium takes place, the image subtraction technique is not always adequately efficient.

Furthermore, to widen the area highlighted by the moving gas bubble, several temporally successive images can be superimposed: in this case the disturbances and the "noise", which do not repeat themselves identically in the various images, remain in the final image at different points and even the removal of the mask is ineffective, making the diagnostic information not very usable if not even poorly suitable for distinguishing the structure of the organ under examination.

OBJECTS OF THE INVENTION

The main purpose of the present invention is to propose a method which, applied to the imaging process which prepares the images displayed on the monitor at the disposal of the operating doctor, allows the DSA procedure to be implemented with the automatic subtraction of the most suitable image from the images acquired during the introduction of the contrast medium consisting of CO2.

Another object of the invention is to make images available to the doctor quickly, promptly and without the need for intervention by other personnel, to allow the necessary assessments to guide the continuation of the current examination, while still obtaining optimal images after the exam.

Another object of the invention is to provide an algorithm which is capable of performing the subtraction between the most suitable images, according to the DSA technique, autonomously and with a result that allows the aforementioned purposes to be achieved.

A further object of the invention is also to propose a method that can be easily used in currently operating DSA angiography equipment, with implementation, integration and/or replacement of elements that do not involve substantial structural and functional reconfigurations of the equipment.

The above mentioned objects are entirely achieved, in accordance with the content of the claims and with preferred but not exclusive embodiments of the invention, by means of the method claimed for the implementation of angiography with DSA technique and use of a contrast medium consisting of carbon dioxide.

BRIEF DESCRIPTION OF THE DRAWINGS

The characteristics of the invention, as will emerge from the claims, are highlighted in the following detailed description, with reference to the attached drawings, in which:

the series of FIGS. 2A, 23, 20, 2D, 2E and 2F illustrate an exemplary sequence of digital radiological images obtained without applying the DSA image subtraction;

the series of FIGS. 3A, 33, 30, 3D, 3E and 3F illustrate the example sequence of digital radiological images obtained after applying the DSA image subtraction, in accordance with the method object of the present invention.

DESCRIPTION OF PREFERRED EMBODIMENTS OF THE INVENTION

Figure 1:
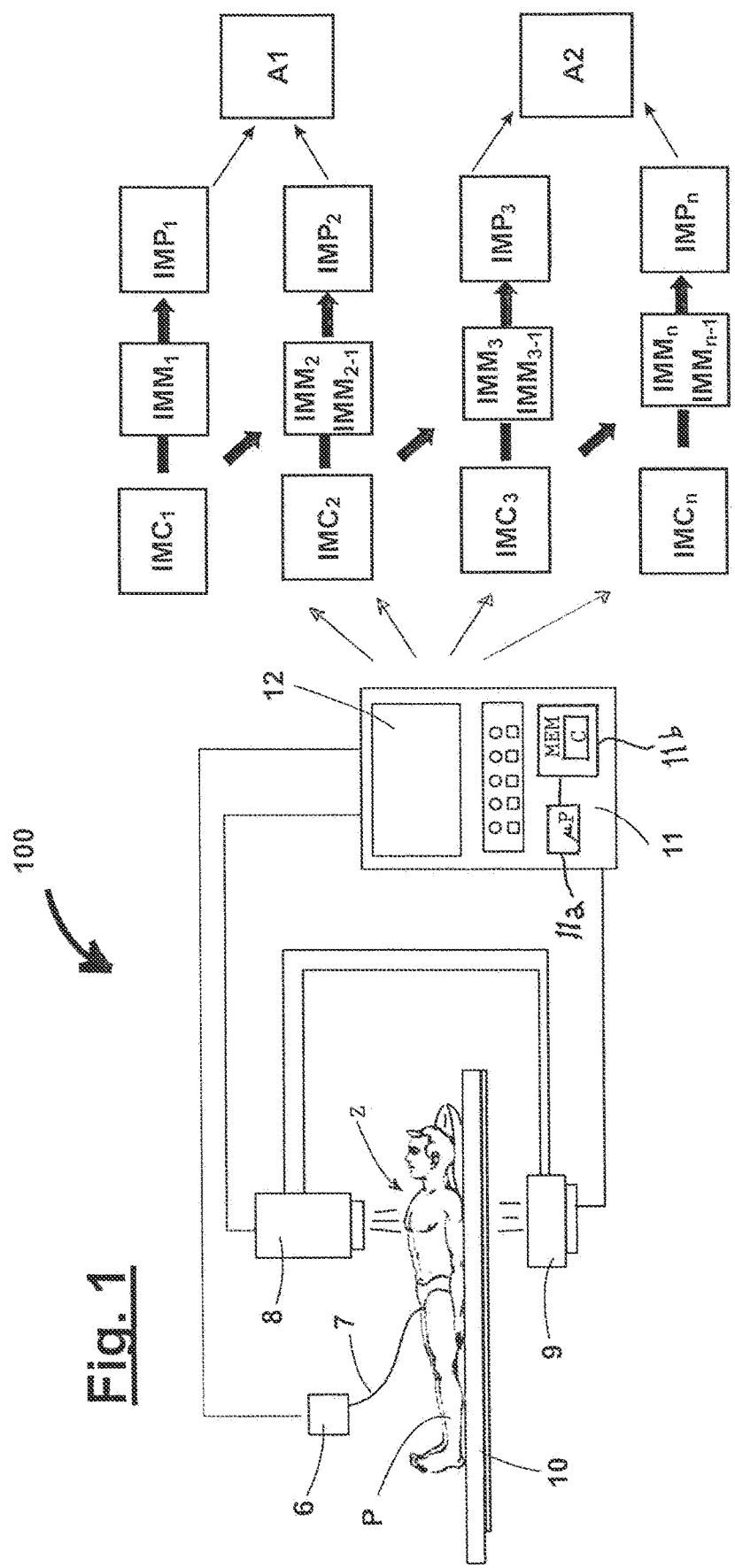
FIG. 1 illustrates a schematic view of a device for carrying out an examination or an intervention with angiography using carbon dioxide as a contrast medium and implementing the method according to the invention.

With reference to FIG. 1, and to a preferred but not exclusive embodiment of the invention, 100 indicates, as a whole, a device for carrying out an intervention with angiography, for example for examining the conditions of a trait of a patient's vascular system.

The device 100 includes an apparatus 6 for the dosage and regulation of a contrast medium used in performing the angiography, which works according to known methods and which will therefore not be described in greater detail. The device 100 will thus typically include at least one processor; and at least one non-transitory computer-readable memory including a computer program, where the at least one memory and the computer program are configured, with the at least one processor, to cause the apparatus to carry out an angiographic exam.

The apparatus 6 uses a gas phase contrast medium, preferably constituted by CO2 (carbon dioxide), which is injected into the vascular system of a patient P by means of a catheter 7, of a known type.

The catheter 7 is introduced, for example at the groin, into a blood vessel (e.g. femoral artery) until it reaches the examination zone Z; this action also follows known and usually applied methods.

Although the method proposed here was conceived mainly for the execution of angiography with the use of a gaseous contrast medium, it must nevertheless be understood that the same inventive principle, and in particular the method in question, can be equally advantageously used with the administration of a contrast medium in the liquid phase, without it being however necessary to make substantial changes to the phases according to which the method itself takes place.

As illustrated in FIG. 1, the patient P is lying down, usually in a supine position, on a table 10 arranged in correspondence with a radiological apparatus 100 comprising an X-ray generator 8, located above the table 10, and an acquisition device 9, sensitive to the radiation emitted by the generator 8 and located below the table 10.

The generator 8 and the acquisition device 9 are connected, as well as the apparatus 6 for the repeated delivery of doses of the contrast medium, to a control unit 11, which manages and coordinates the operation of these devices in such a way to produce a series of images taking into account the displacement of the gas bubbles inside the vessel and the times of dispersion of the gas in the blood.

The control unit 11 also contains within it an imaging system, connected to means for processing the signals received by the acquisition device 9, having the function of creating and processing corresponding digital images, which are then displayed on an accessible display 12 to the surgeon.

The introduction of pre-selected and adjustable doses of CO2 occurs with a frequency determined by the surgeon who conducts the examination and which depends substantially on the time that the gas bubble takes to move the blood and cross the examination area.

Indicatively, in the peripheral vascular system the frequency of image recovery remains between 2 and 7 per second while when the angiographic intervention affects an area characterized by a more marked dynamic, for example the heart, or more likely the coronary arteries, then the shooting frequency of digital images can rise up to a number of 25 per second.

In order to implement the method in question, and for subsequent processing according to a program including code executed by a signal processor and for display, the digital images obtained are recorded by the signal processor in a non-transitory computer-readable memory (not shown)

connected or internal to the control unit 11, which can then be recalled according to known methods.

In order to better illustrate and understand the present invention, hereinafter the image "contrast image" IMC is defined as the raw image obtained after the introduction of the contrast medium and not subjected to any subtraction processing.

By "IMM mask image" we mean the image that is used to subtract from the IMC contrast image.

Finally, by "clean image" IMP we mean the image processed by subtracting the IMM mask image from the IMC contrast image.

In accordance with the invention, the method provides for producing a series of clean digital radiological images IMP1, IMP2, IMP3 IMPn free of noise and "noise", made when the contrast medium diffuses in the examination zone Z, by subtraction of the respective mask images IMM1, IMM2, IMM3 . . . IMMn obtained from previous images with IMC (2-1), IMC (3-1) . . . IMC (n-1) contrast.

As evident from what has been said above, the digital radiological images are obtained with an imaging process starting from the representation of the examination zone Z produced by the X radiation that passes through it and detected by suitable sensitive detection means 9 constituted by the acquisition device.

According to a preferred embodiment of the method object of the present invention, each mask image IMM1, IMM2, IMM3 IMMn, used to obtain a dean image IMP1, IMP2, IMP3 IMPn from each image with contrast IMC1, IMC2, IMC3 . . . IMCn, is realized using the image with contrast medium IMC (2-1), IMC (3-1) . . . IMC (n-1) immediately preceding the current image.

In practice, after the first IMM1 mask image, obtained without contrast medium and subtracted from the first IMC1 contrast image, the latter is used as the IMM2 mask image, for subtraction in the subsequent IMC2 contrast image.

This cycle is subsequently repeated until the end of the angiographic examination.

Figure 2A:
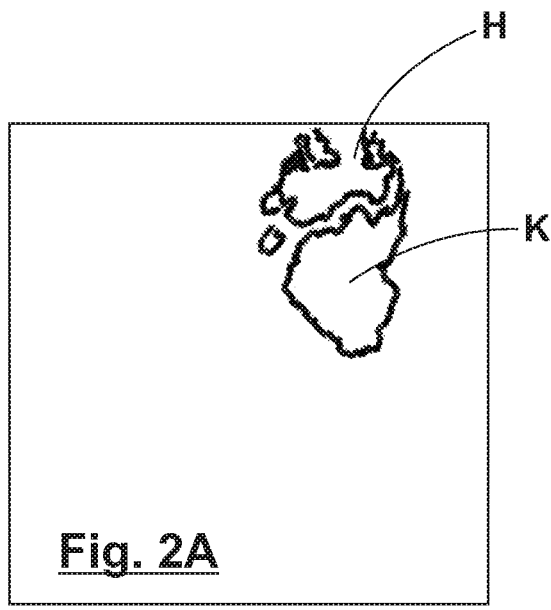
Figure 3A:
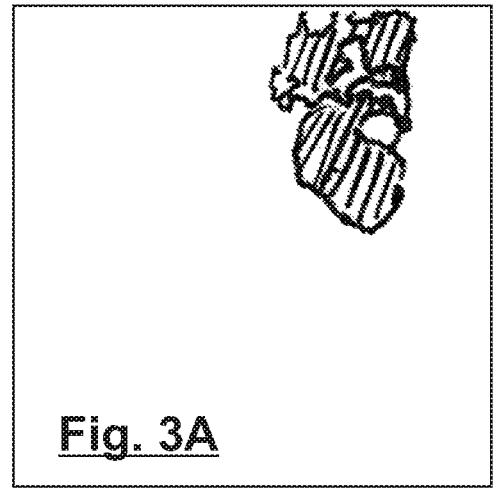
Figure 2B:
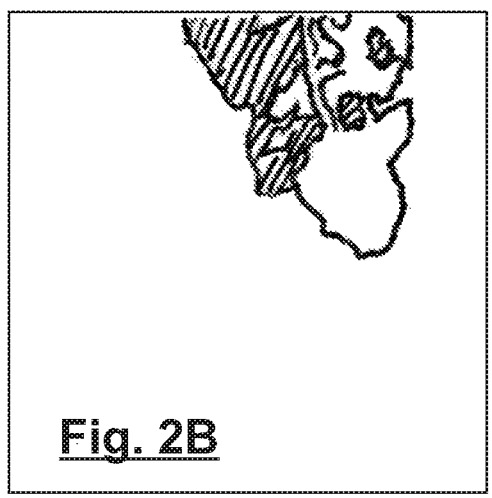
Figure 3B:
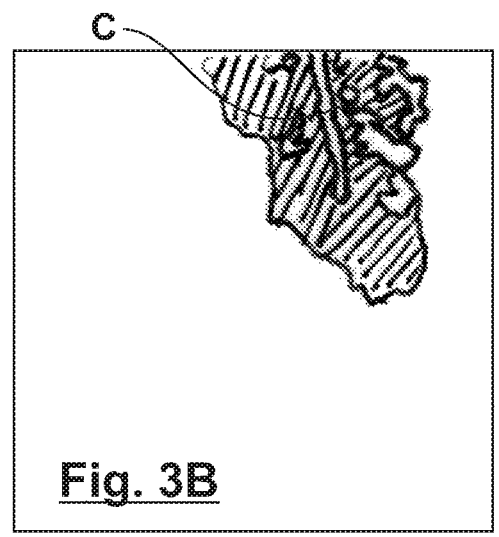
Figure 2C:
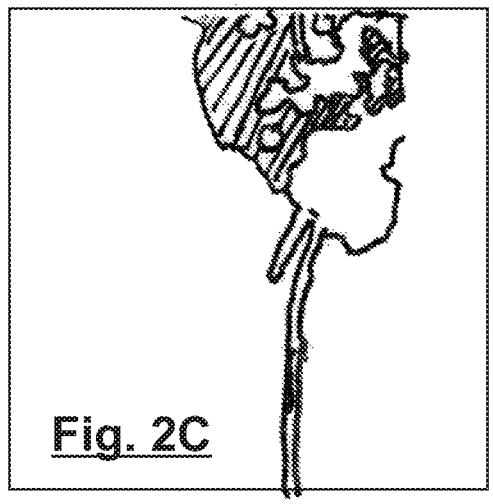
Figure 3C:
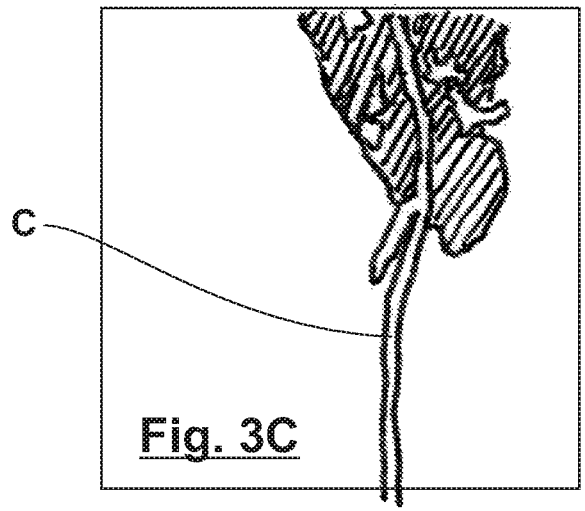
Figure 2D:
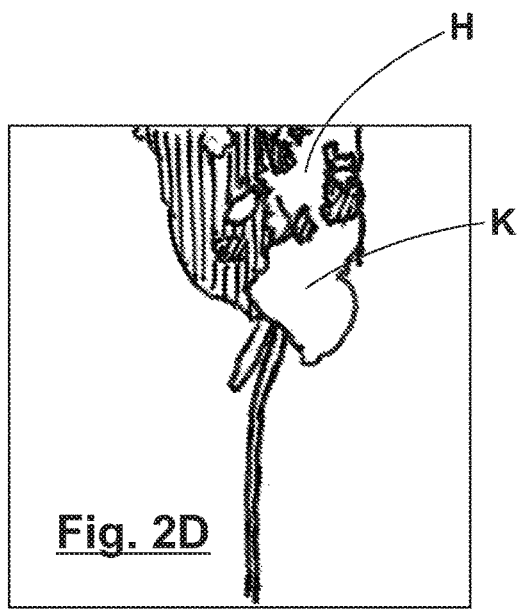
Figure 3D:
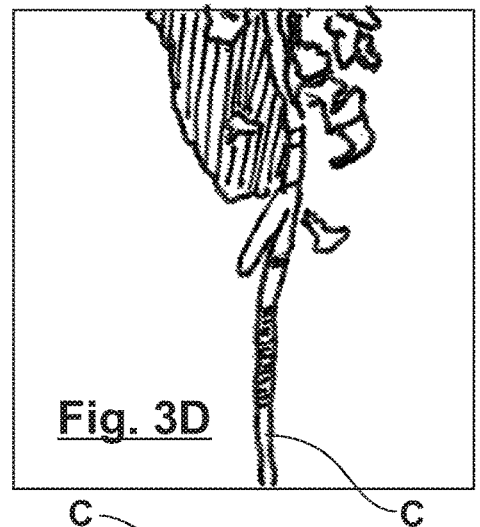
Figure 2E:
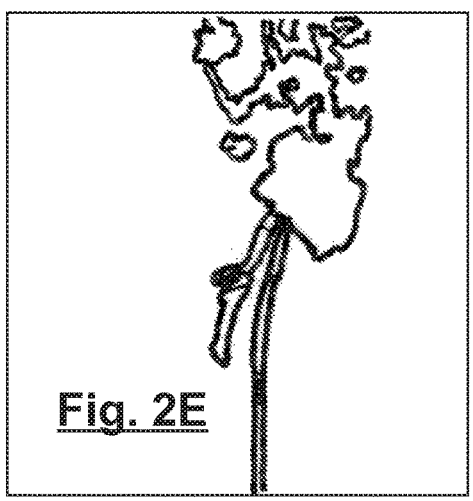
Figure 3E:
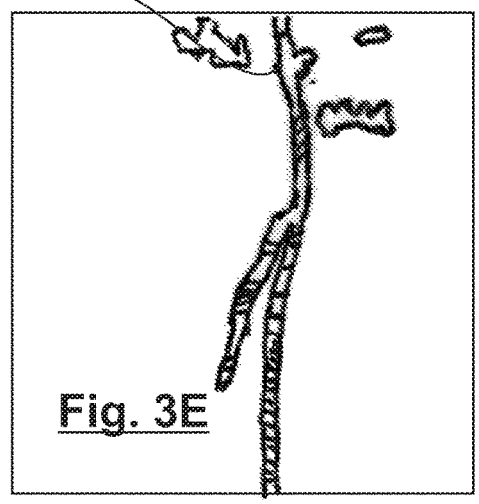
Figure 2F:
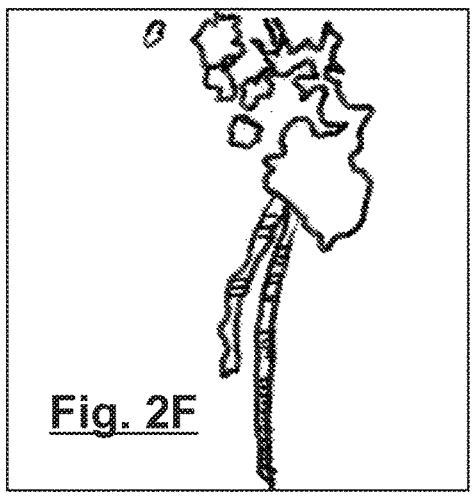
Figure 3F:
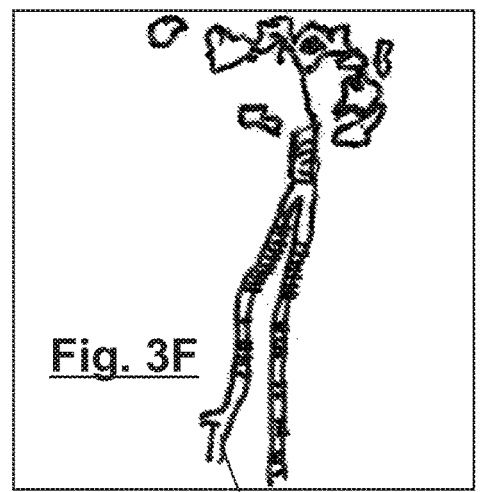

So, proceeding in stages, it is expected:
a) obtaining an IMM1 mask image, before the contrast medium is introduced; a representation of this image can be seen in FIG. 2A, in which some air pockets H, K, present in the intestine, which cover the examination area and create disturbance to vision can also be observed; in FIG. 3A the same image of FIG. 2A can be seen after the subtraction of the mask image;
b) obtaining an IMC1 image with contrast medium introduced into the blood vessel; in FIG. 2B the contrast medium has already been introduced, but the organs H and K prevent a correct view of the vessel;
c) the subtraction of the IMM1 mask image from the image with IMC1 contrast medium, obtaining a first clean image IMP1; the image of FIG. 3B is the result of the subtraction of the image of FIG. 2A from the image of FIG. 2B; it can be seen the disappearance of the organs H and K and the presence of the contrast medium C along the vessel in question;
d) obtaining a new image with IMC2 contrast, as shown in FIG. 2C;
e) obtaining a new IMM2 mask image consisting of the IMC contrast image (2-1) prior to the radiological image with the IMC2 contrast medium currently obtained, practically the image of FIG. 2B;
f) the subtraction, from the IMC2 contrast image, of the respective IMM2 mask image, consisting of the previous IMC contrast image (2-1), with a corresponding clean radiological image IMP2 being obtained; the image obtained is that of FIG. 3C, given by the subtraction of the image of FIG. 2B from the image of FIG. 2C; note the expansion of the contrast medium C along the vessel in question;
g) the repetition of the steps b, c, d, and until the end of the examination, obtaining the images referred to in FIGS. 2D, 2E, 2F, and the respective clean images referred to in FIGS. 3D, 3E, 3F; in image 3F you can see the contrast medium that is flowing in the outermost part (with respect to the image) of the vessel and is leaving the examination area.

To perform the subtraction of the IMM1, IMM2, IMM3 . . . IMMn mask images from the IMC1, IMC2, IMC3 . . . IMCn contrast images, suitable algorithms are provided, operating by means of a program executed by the signal processor in the control unit 11 for processing and displaying the images.

These algorithms are in particular capable of subtracting the logical states that make up the IMM1, IMM2, IMM3 . . . IMMn digital mask images from the corresponding logical states that make up the digital images with contrast IMC1, IMC2, IMC3 . . . IMCn.

An alternative embodiment of the method according to the invention provides, that the aforementioned mask images IMM1, IMM2, IMM3 . . . IMMn are obtained by processing at least two images with contrast medium previous to the current contrast image (IMC2, IMC3 . . . IMCn). The processing can for example consist in calculating the weighted average of the corresponding pixel values in two or more previous images.

This variant allows to obtain more effective mask images IMM1, IMM2, IMM3 . . . IMMn in some operating situations, for example when modest and short-term variations of abdominal or lung gas occur.

According to a further embodiment of the method, IMPPn weighted clean images are obtained, in which each pixel is chosen from the equivalent pixels of a number s of clean images (IMPn-1, IMPn-2 . . . IMPn-s) previous, obtained as described above, in which the value of parameter s is defined by the operator. In particular, to define the given pixel of the current IPMP weighted clean image, the one with the highest differential value is chosen among the s pixels of the previous clean images. In this way, according to the present method each clean weighted image IMPPn contains, in each own pixel, the highest differential value among those previously calculated for the previous s clean images.

In essence, the value of the parameter s defines the "depth" of analysis of the clean images obtained in the previous cycles to calculate each pixel of the new IMPPn weighted clean image.

As an example, if a parameter s=3 is defined, the sequence of obtaining the clean images, and the corresponding clean weighted images, for the first 6 processing cycles will be the following, considering having images with pixel matrices (r, c) of size 1024×1024:

IMM1=IMC1
IMP2=IMC2−IMM1→IMM2=IMM2: IMPP2=IMP2
IMP3=IMC3−IMM2→IMM3=IMC3: IMPP3=IMP3
IMP4=IMC4−IMM3→IMM4=IMC4:    IMPP4   (r, c)=maxvalue (IMP4 (r; c), IMP3 (r; c), IMP2 (r; c)) *;
IMP5=IMC5−IMM4→IMM5=IMC5:    IMPP5   (r, c)=maxvalue (IMP5 (r; c), IMP4 (r; c), IMP3 (r; c)) *;
IMP6=IMC6−IMM5→IMM6=IMC6:    IMPP6   (r, c)=maxvalue (IMP6 (r; c), IMP5 (r; c), IMP4 (r; c)) *;
to be repeated for each pair of pixels that make up the image, that is: r=1÷1024/c=1÷1024

In this way, the software program that implements the above described embodiment of the method allows you to "drag" behind the pixels with a higher value (i.e., those that contain more useful information) for a "frame" window of length decided by the operator in real time.

The clean images IMP1, IMP2, IMP3 ... IMPn or IMPP1, IMPP2, IMPP3 ... IMPPn, obtained with the present method can then be superimposed on each other to obtain an angiogram A1, A2 with a more complete representation of the examination area Z, including multiple immissions of contrast medium.

Or, the clean images IMP1, IMP2, IMP3 ... IMPn, or IMPP1, IMPP2, IMPP3 IMPPn, or the angiograms A1, A2 thus obtained, can be brought together and joined together to obtain a zone of more extensive Z exam.

Inside the control unit 11, computer program means are provided, consisting of a series of readable and executable instructions by a microprocessor, for carrying out the method object of the present invention.

The program means incorporate the aforementioned algorithms for superimposing two or more of the dean images IMP1, IMP2, IMP3 ... IMPn with each other, and/or for combining and joining two or more angiograms A1, A2 to obtain the examination area Z more extended.

At the end of the operation, the surgeon can recall all the images taken during the angiographic intervention, and in time seek the ones that are best suited to constitute a mask image for each image with contrast IMC1, IMC2, IMC3 ... IMCn, perform the subtraction and obtain optimal images to deepen the study of the case or for disclosure or other purposes.

As is apparent to the skilled in the art, the method proposed here allows to achieve all the aforementioned purposes.

With its application to the imaging process that prepares the images displayed on the monitor at the disposal of the operating surgeon, it is possible to implement the DSA system by subtracting the most suitable image from the images gradually acquired when the contrast medium was introduced in the form of CO2 without the need for intervention by other technical personnel, allowing the surgeon to continue the angiographic examination having suitable images available in real time.

However, it is still possible to obtain optimal images after the exam.

It is also possible to superimpose different radiological images obtaining a more complete and extended image of the area of interest, with respect to the image that can be obtained for each entry of the contrast medium.

It is hoped that the possibility of conducting the examination by the surgeon in complete autonomy and with greater ease constitutes a valid incentive for the diffusion of the DSA angiographic technique with the use of CO2 as a contrast medium, limiting, if not eliminating the disturbances, the side effects and the possible complications deriving from the use of the contrast medium itself, in particular of an iodinated contrast medium.

Finally, the proposed method can be easily implemented in currently operating DSA angiography equipment, with additions and/or replacements of mostly computer elements, which do not involve substantial structural reconfigurations of such equipment.

It is understood that the above has been described purely by way of non-limiting examples. Therefore, possible modifications and variations of the invention are considered to fall within the protective scope accorded to the present technical solution, as described above and claimed below.

The invention claimed is:

1. A method for the improvement of radiological images in the course of an angiography exam, comprising introducing a fluid contrast medium in an examination zone (Z) of a human or animal body, obtaining digital radiological images (IMC1, IMC2, IMC3 ... IMCn) of the examination zone (Z) when the contrast medium is introduced, subtracting from each image (IMC1, IMC2, IMC3 ... IMCn) with contrast medium a mask image (IMM1, IMM2, IMM3 ... IMMn) of the same zone (Z), and thereby producing a series of clean digital radiological images (IMM1, IMM2, IMM3 ... IMMn) free of noise, wherein each mask image (IMM1, IMM2, IMM3 ... IMMn) consists of at least one image with contrast (IMC (2-1), IMC (3-1) ... IMC (n-1)) chosen from at least one of the images prior to the image with contrast currently obtained, the method further comprising:
a) obtaining a mask image (IMM1), before entering the contrast medium;
b) obtaining an image with contrast medium (IMC1);
c) subtracting the mask image (IMM1) from the image with contrast medium (IMC1), thereby obtaining a first clean image (IMP1);
d) obtaining a new image with contrast medium (IMC2);
e) obtaining a new mask image (IMM2, IMM3 ... IMMn) consisting of the image with contrast medium (IMC (2-1), IMC (3-1) ... IMC (n-1)) immediately preceding the image with contrast medium (IMC2, IMC3 ... IMCn) currently obtained;
f) subtracting from the image with contrast medium (IMC2, IMC3 ... IMCn), of the respective mask image (IMM2, IMM3 ... IMMn) constituted by the previous radiological image with contrast medium (IMC (2-1), IMC (3-1) ... IMC (n-1)), thereby obtaining a corresponding clean radiological image (IMP2, IMP3 ... IMPn);
g) repeating steps b, c, d, and until an end of the exam.

2. The method according to claim 1, wherein said digital radiological images (IMC1, IMC2, IMC3 ... IMCn) are obtained with an imaging process starting from a representation of the examination zone (Z) produced by the X radiation that passes through it and detected by suitable sensitive detection means (9).

3. The method according to claim 1, wherein said contrast medium is constituted by CO2.

4. The method according to claim 1, wherein said subtraction is carried out by means of suitable algorithms suitable for subtracting the logical states that make up the digital mask images (IMM1, IMM2, IMM3 ... IMMn) from the corresponding logical states that make up the digital images with contrast (IMC1, IMC2, IMC3 ... IMCn).

5. The method according to claim 1, wherein two or more of the clean images (IMP1, IMP2, IMP3 ... IMPn) are superimposed on each other to obtain an angiogram (A1, A2) with a more complete representation of the examination zone (Z), including multiple immissions of contrast medium.

6. The method according to claim 1, wherein two or more angiograms (A1, A2) are combined and joined to obtain the image of an examination zone (Z) plus extended.

7. An apparatus comprising: at least one processor and at least one memory including a computer program, where the at least one memory and the computer program are configured, with the at least one processor, to cause the apparatus to carry out the method of claim 1.

8. The apparatus according to claim 7, configured to superimpose two or more of the clean images (IMP1, IMP2, IMP3 . . . IMPn) together, to obtain an angiogram (A1, A2) with a more complete representation of the zone of examination (Z), including multiple immissions of contrast medium.

9. The apparatus according to claim 7, configured to approach and join two or more angiograms (A1, A2) for obtaining the image of a larger zone of examination (Z).

10. A non-transitory computer readable medium having computer program code stored thereon for execution of the method of claim 1 by a signal processor.

11. A method for the improvement of radiological images in the course of an angiography exam, comprising introducing a fluid contrast medium in an examination zone (Z) of a human or animal body, obtaining digital radiological images (IMC1, IMC2, IMC3 . . . IMCn) of the examination zone (Z) when the contrast medium is introduced, subtracting from each image (IMC1, IMC2, IMC3 . . . IMCn) with contrast medium a mask image (IMM1, IMM2, IMM3 IMMn) of the same zone (Z), and thereby producing a series of clean digital radiological images (IMM1, IMM2, IMM3 . . . IMMn) free of noise, wherein each mask image (IMM1, IMM2, IMM3 . . . IMMn) consists of at least one image with contrast (IMC (2-1), IMC (3-1) . . . IMC (n-1)) chosen from at least one of the images prior to the image with contrast currently obtained, the method further comprising:
  a) obtaining a mask image (IMM1), before entering the contrast medium;
  b) obtaining an image with contrast medium (IMC1);
  c) subtracting the mask image (IMM1) from the image with contrast medium ((IMC1), thereby obtaining a first clean image (IMP1);
  d) obtaining a new image with contrast medium (IMC2);
  e) obtaining a new mask image (IMM2, IMM3 . . . IMMn) consisting of a weighted average of at least two images with contrast medium previous to the image with contrast medium (IMC2, IMC3 . . . IMCn) currently obtained;
  f) subtracting from the image with contrast medium (IMC2, IMC3 . . . IMCn), of said new mask image (IMM2, IMM3 . . . IMMn), thereby obtaining a corresponding clean radiological image (IMP2, IMP3 . . . IMPn);
  g) repeating steps b, c, d, and until an end of the exam.

12. An apparatus comprising: at least one processor and at least one memory including a computer program, where the at least one memory and the computer program are configured, with the at least one processor, to cause the apparatus to carry out the method of claim 3.

13. The apparatus according to claim 12, configured to superimpose two or more of the clean images (IMP1, IMP2, IMP3 . . . IMPn) together, to obtain an angiogram (A1, A2) with a more complete representation of the zone of examination (Z), including multiple immissions of contrast medium.

14. The apparatus according to claim 12, configured to approach and join two or more angiograms (A1, A2) for obtaining the image of a larger zone of examination (Z).

15. A non-transitory computer readable medium having computer program code stored thereon for execution of the method of claim 11 by a signal processor.

16. A method for the improvement of radiological images in the course of an angiography exam, comprising introducing a fluid contrast medium in an examination zone (Z) of a human or animal body, obtaining digital radiological images (IMC1, IMC2, IMC3 . . . IMCn) of the examination zone (Z) when the contrast medium is introduced, subtracting from each image (IMC1, IMC2, IMC3 . . . IMCn) with contrast medium a mask image (IMM1, IMM2, IMM3 . . . IMMn) of the same zone (Z), and thereby producing a series of clean digital radiological images (IMM1, IMM2, IMM3 . . . IMMn) free of noise, wherein
  each mask image (IMM1, IMM2, IMM3 . . . IMMn) consists of at least one image with contrast (IMC (2-1), IMC (3-1) . . . IMC (n-1)) chosen from at least one of the images prior to the image with contrast currently obtained, the method further comprising defining a depth parameter s, based on said parameter, obtaining clean weighted images (IMPPn), in which each pixel is chosen from equivalent pixels of a number s of clean images (IMPn-1, IMPn-2 . . . IMPn-s); a definition of each pixel of each clean weighted image (IPMPn) consisting in a choice, among s pixels of the previous clean images, one with a highest differential value.

17. An apparatus comprising: at least one processor and at least one memory including a computer program, where the at least one memory and the computer program are configured, with the at least one processor, to cause the apparatus to carry out the method of claim 16.

18. The apparatus according to claim 17, configured to superimpose two or more of the clean images (IMP1, IMP2, IMP3 . . . IMPn) together, to obtain an angiogram (A1, A2) with a more complete representation of the zone of examination (Z), including multiple immissions of contrast medium.

19. The apparatus according to claim 17, configured to approach and join two or more angiograms (A1, A2) for obtaining the image of a larger zone of examination (Z).

20. A non-transitory computer readable medium having computer program code stored thereon for execution of the method of claim 16 by a signal processor.

* * * * *